United States Patent
Chang

(10) Patent No.: US 9,841,339 B2
(45) Date of Patent: Dec. 12, 2017

(54) DOUBLE-ACTING PRESSURE SENSOR

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 14/838,746

(22) Filed: Aug. 28, 2015

(65) Prior Publication Data

US 2017/0059432 A1    Mar. 2, 2017

(51) Int. Cl.
  *G01L 7/08* (2006.01)
  *G01L 9/04* (2006.01)
  *G01L 9/00* (2006.01)
  *H01G 7/00* (2006.01)

(52) U.S. Cl.
  CPC ................. *G01L 9/0051* (2013.01)

(58) Field of Classification Search
  None
  See application file for complete search history.

(56) References Cited

U.S. PATENT DOCUMENTS

| | | | | |
|---|---|---|---|---|
| 6,388,556 B1 * | 5/2002 | Imai | ............ | G01L 1/20 338/114 |
| 7,068,142 B2 * | 6/2006 | Watanabe | ............ | H01C 10/106 338/114 |
| 8,471,441 B2 * | 6/2013 | Tsuda | ............ | H03H 3/08 310/313 B |
| 8,800,385 B2 * | 8/2014 | Ikebe | ............ | G01L 1/04 73/862.041 |
| 9,274,016 B2 * | 3/2016 | Tokuda | ............ | G01L 9/0051 |
| 2008/0098820 A1 * | 5/2008 | Morsch | ............ | G01L 9/0045 73/717 |
| 2010/0107770 A1 * | 5/2010 | Serban | ............ | G01L 1/142 73/718 |
| 2012/0198945 A1 * | 8/2012 | Yoneyama | ............ | B25J 13/083 73/862.042 |

* cited by examiner

*Primary Examiner* — Peter Macchiarolo
*Assistant Examiner* — Jermaine Jenkins
(74) *Attorney, Agent, or Firm* — Steven Reiss

(57) ABSTRACT

A pressure sensor includes a base having a bottom wall and a first sidewall enclosed with the bottom wall to form a first receiving space. A pressure sensitive film is located in the first receiving space and the peripheral portion of the pressure sensitive film is arranged on the first sidewall. An elastic cover has a top wall, a second sidewall, and a protrusion. The top wall and the second sidewall are enclosed to form a second receiving space. The second sidewall is located on the first sidewall of the base, the protrusion extends from the top wall to the second receiving space and makes contact with the pressure sensitive film, transferring an external pressure to the pressure sensitive film. The resistance of the pressure sensitive film is virtually linear corresponding to the external pressure.

10 Claims, 5 Drawing Sheets

DOUBLE-ACTING PRESSURE SENSOR

FIELD

The subject matter herein generally relates to a mechanical pressure sensor.

BACKGROUND

In the field of mechanical pressure sensors, a pressure sensitive film is used as a sensor to detect the external pressure. The pressure sensitive film needs to have a linear variation range of resistances for measuring external pressure.

BRIEF DESCRIPTION OF THE DRAWINGS

Implementations of the present technology will now be described, by way of example only, with reference to the attached figures.

DETAILED DESCRIPTION

Figure 1:
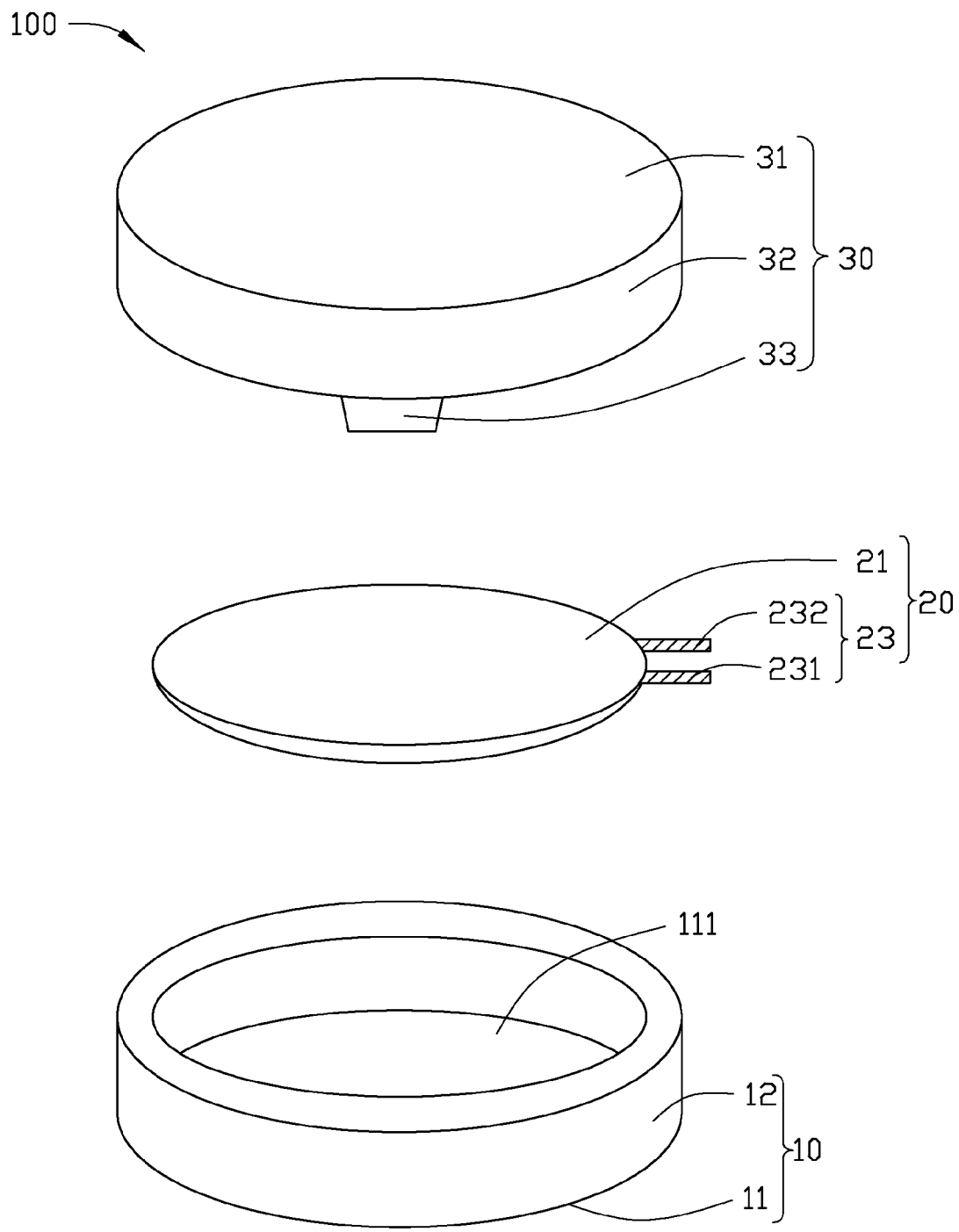
FIG. 1 is an isometric, exploded, sectional view of a pressure sensor according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
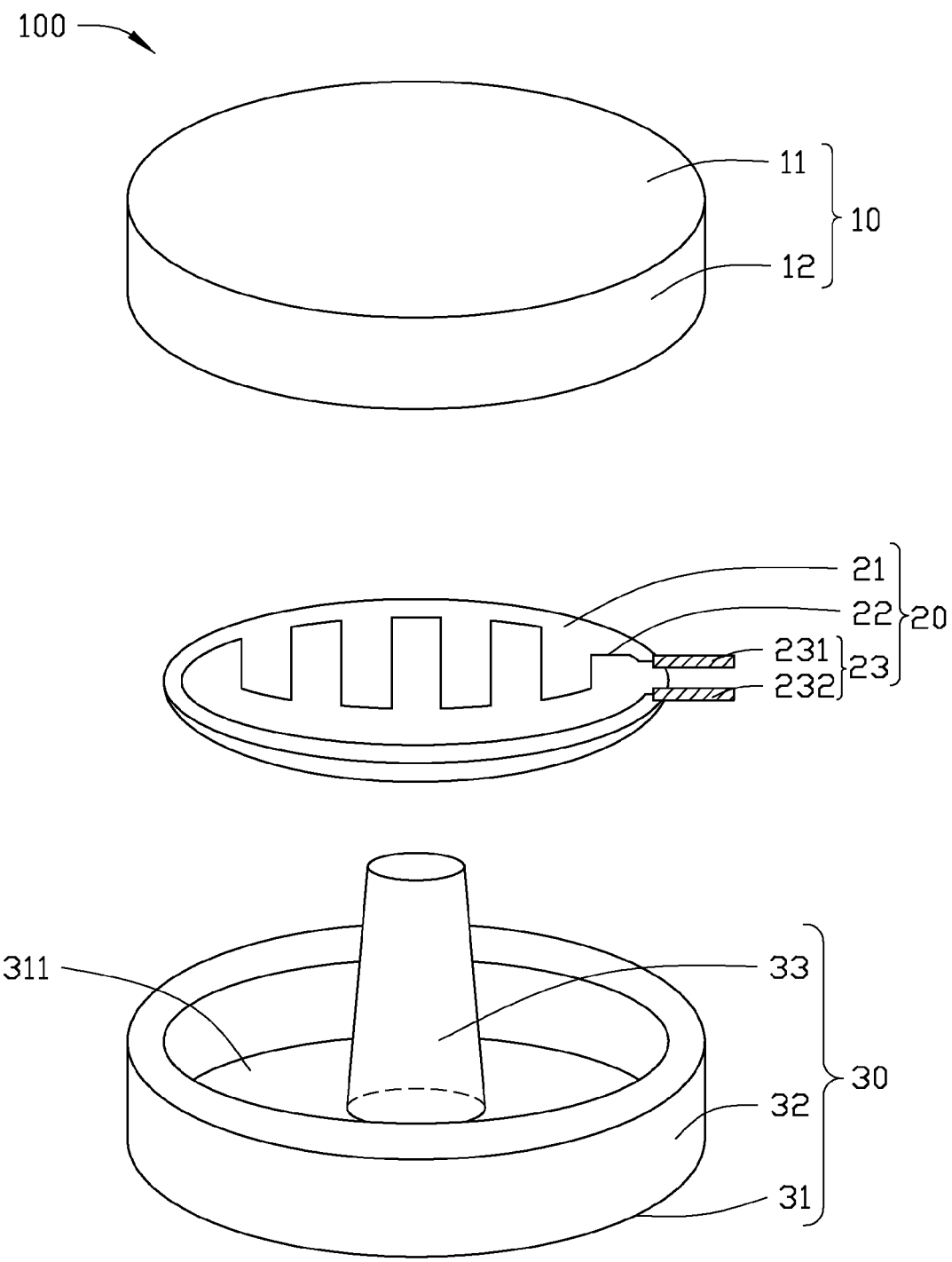
FIG. 2 is an isometric, exploded, sectional view of a pressure sensor in FIG. 1 viewed from a different angle.

FIG. 1 illustrates a pressure sensor 100 which includes a base 10, a pressure sensitive film 20, and an elastic cover 30. FIG. 2 illustrates the pressure sensor 100 from a different view angle. The base 10 includes a bottom wall 11 and a first side wall 12. The bottom wall 11 and the first sidewall 12 are enclosed to form a first receiving space 111. The pressure sensitive film 20 is located in the first receiving space 111 and the peripheral portion of the pressure sensitive film 20 is arranged on the first sidewall 12. The pressure sensitive film 20 includes a bulk film 21, a strained resistance wire 22, and an electrode pair 23. The electrode pair 23 includes a first electrode 231 and a second electrode 232. The electrode pair 23 can be made of metal or conductive film. The first electrode 231 and the second electrode 232 connect the different ends of the strained resistance wire 22 of the pressure sensitive film 20 and measure different resistances between each electrode of the electrode pair 23. The elastic cover 30 includes a top wall 31, a second sidewall 32, and a protrusion 33. The top wall 31 and the second sidewall 32 are enclosed to form a second receiving space 311.

Figure 3:
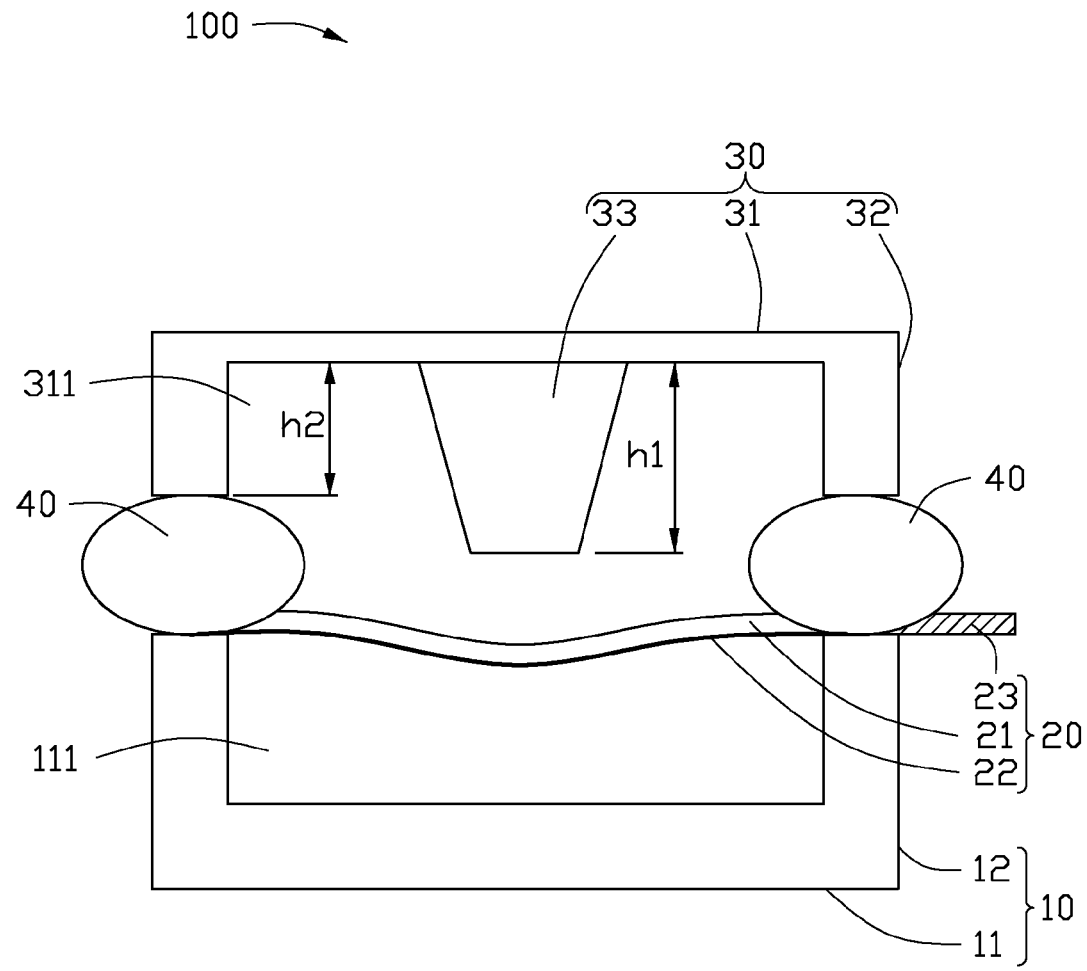
FIG. 3 is a diagrammatic, cross-sectional view of a pressure sensor in FIG. 1.

FIG. 3 illustrates the sectional view of the pressure sensor 100. The second sidewall 32 of the elastic cover 30 is positioned and fixed on the first sidewall 12 of the base 10 with adhesive 40. The protrusion 33 of the elastic cover 30 is extended from the inner surface of the top wall 31 to the receiving space and makes contact with the pressure sensitive film 20, for transferring the force of a pressure to the pressure sensitive film 20. The height of the second side wall 32 is h1 and the height of the protrusion 33 is h2. In at least one embodiment, the height of the protrusion 33 is larger than the height of the second sidewall, thus h2>h1. The adhesive 40 is used to bond the second sidewall 32 with the first sidewall 12. The adhesive 40 can be epoxy resin, hybrid epoxy resin, glue, or a mix of the above.

Figure 4A:
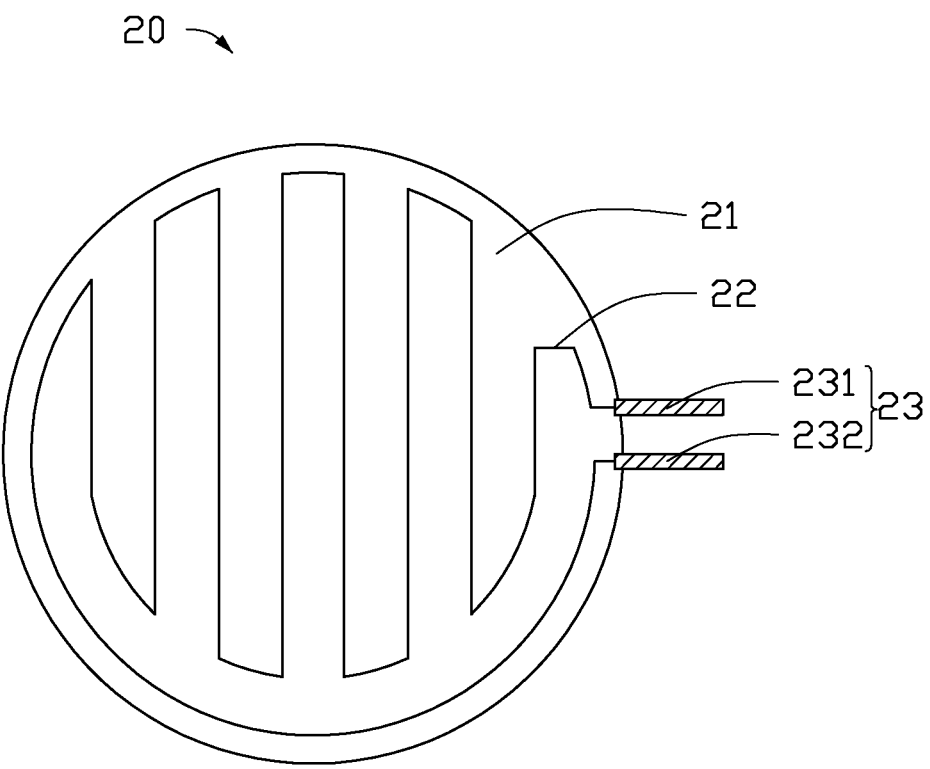
FIG. 4A is a diagrammatic bottom plan view of a pressure sensitive film of a pressure sensor in FIG. 1.
Figure 4B:
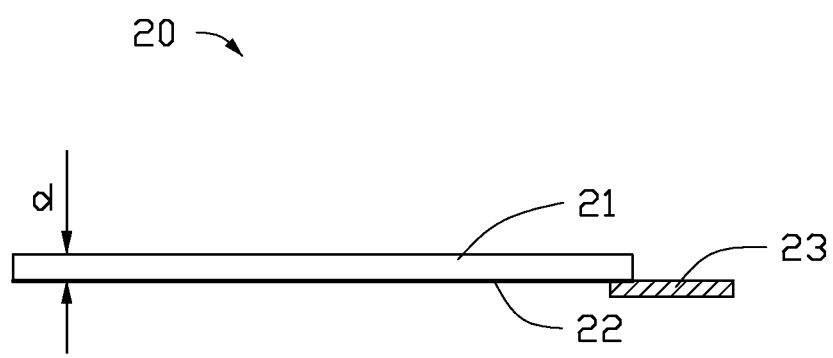
FIG. 4B is a diagrammatic, cross-sectional view of a pressure sensitive film of a pressure sensor in FIG. 1.

FIG. 4A and FIG. 4B respectively illustrate a plane view and a sectional view of the pressure sensitive film 20 with the strained resistance wire 22. The strained resistance wire 22 has a multiple waveform shape with two different ends. The two different ends of the strained resistance wire 22 respectively connect with the first electrode 231 and the second electrode 232. In addition, the pressure sensitive film 20 has a thickness (d). The thickness (d) is less than 1 mm in present embodiment. The pressure sensitive film 20 can be selected from one of stainless sheet, metal alloy expoy film, silver epoxy film, silicone film, graphite film, carbon nanotube (CNT) film, or epoxy resin film. The strained resistance wire 22 can be made of silver nano wire, conductive polymers, CNT, or graphene.

Figure 5:
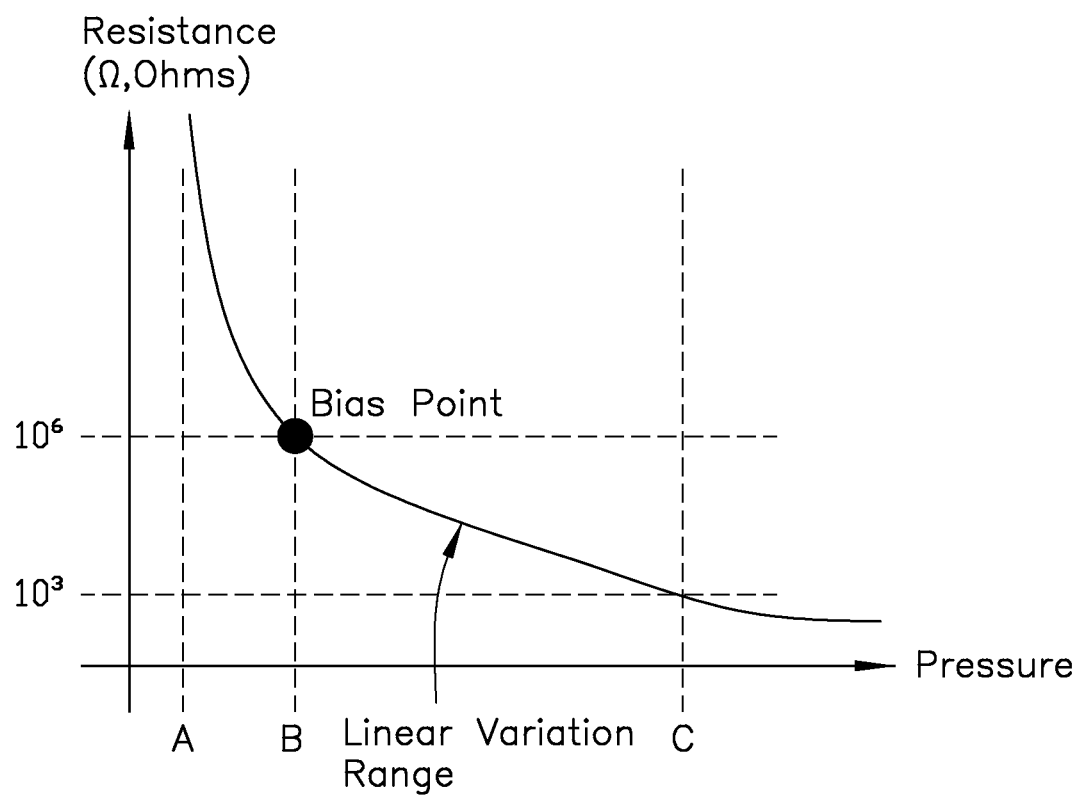
FIG. 5 is a resistance and external pressure characteristics curve of a pressure sensor in FIG. 1.

FIG. 5 illustrates a characteristic curve of resistance to external pressure by the pressure sensitive film 20. The resistance of the pressure sensitive film 20 approaches infinity as external pressure approaches zero (shown as point A in FIG. 5). The resistance of the pressure sensitive film 20 changes in a linear fashion within a pressure range from point B (bias point) to point C. As the external pressure, which is loaded on the pressure sensitive film 20, increases, the resistance of the pressure sensitive film decreases, as detected by the electrode pair 23. The method of applying a bias can be an external bias voltage or an external pressure force. The resistance of point B is 1 mega ohms (1 M $\Omega$) and the resistance of point C is 1 kilo ohms (1 k $\Omega$) in at least one embodiment. The bias point is set at point B and the resistance of the pressure sensitive film 20 is a substantially linear progression from point B to point C.

When an external pressure is applied to the top wall 31, the protrusion 33 will touch and transfer the pressure to the pressure sensitive film 20. The pressure sensitive film 20 receives the force of the pressure and results in changing a resistance of the pressure sensitive film following resistance to external pressure characteristic curve. By measuring the resistance variation of the pressure sensitive film 20, the magnitude of the external pressure can be detected.

The embodiments shown and described above are only examples. Many details are often found in the art such as the other features of a pressure sensor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A pressure sensor comprising
   a base including a bottom wall and a first sidewall, the bottom wall and the first sidewall cooperatively forming a first receiving space, the first sidewall having a top portion facing away from the bottom wall;
   a pressure sensitive film having a peripheral portion arranged on the top portion of the first sidewall such that the pressure sensitive film is suspended over the bottom wall, the pressure sensitive film having a resistance changed in a linear variation range within a pressure range; and
   an elastic cover including a top wall, a second sidewall, and a protrusion, the top wall and the second sidewall form a second receiving space, wherein the second sidewall is positioned on the first sidewall of the base, the protrusion extends from the top wall to contact the pressure sensitive film so that a force from the external pressure is transferred to the pressure sensitive film, whereby the resistance of the pressure sensitive film changes in the linear variation range.

2. The pressure sensor of claim 1, wherein the height of the protrusion is larger than the height of the second sidewall.

3. The pressure sensor of claim 1, wherein the thickness of the pressure sensitive film is less than 1 mm.

4. The pressure sensor of claim 1, wherein the pressure sensitive film is selected from one of the stainless sheet, metal alloy epoxy film, silver epoxy film, silicone film, graphite film, carbon nanotube film, or epoxy resin film.

5. The pressure sensor of claim 1, wherein the pressure sensitive film further comprises a strained resistance wire.

6. The pressure sensor of claim 5, wherein the strained resistance wire of the pressure sensitive film is made of silver nano wire, conductive polymers, carbon nanotube, or graphene.

7. The pressure sensor of claim 5, wherein the strained resistance wire of the pressure sensitive film has a multiple waveform shape.

8. The pressure sensor of claim 5, wherein the linear variation range of the resistance for the strained resistance wire of the pressure sensitive film is within a range of $10^6$ ohms-$10^3$ ohms.

9. The pressure sensor of claim 1, wherein the pressure sensor further comprises an adhesive to bond the second sidewall and the first sidewall.

10. The pressure sensor of claim 9, wherein the adhesive is selected from one of epoxy resin, hybrid epoxy resin, glue, or a mix of the above.

* * * * *